Patented Nov. 14, 1944

2,362,575

UNITED STATES PATENT OFFICE 2,362,575

METHOD FOR PREPARING ORGANIC ACID ESTERS OF CELLULOSE

Carl J. Malm, Rochester, N. Y., assignor to Eastman Kodak Company, Rochester, N. Y., a corporation of New Jersey No Drawing. Application March 17, 1942,
Serial No. 435,070

4 Claims. (Cl. 260—225)

This application relates to the preparation of organic acid esters of cellulose containing not more than 10% of groups other than acetyl, which involves the use of acetic anhydride which has been cooled to a temperature of 0° F. or below for the esterification of the cellulose.

In the making of organic acid esters of cellulose on a commercial scale, the esterification is usually conducted in a vessel equipped with a jacket for cooling the reaction mass. In the making of cellulose acetate this may result in excessive cooling next to the walls of the vessel causing gelling of some of the mass.

Various plans have been offered for holding down the temperature resulting from the reaction between cellulose and acetic anhydride but in practically all of those cases either it has been necessary to provide cooling of the walls of the reaction vessel by circulating cold liquid thru the water jacket or the temperature has risen so high that a low viscosity ester resulted. For instance in Malm and Andersen Patent No. 1,908,524 dated May 9, 1933, a process of making cellulose esters is described in which the temperature rises to a peak impelled by the heat of the reaction and thereby low viscosity cellulose esters are obtained. In the various processes for making cellulose acetate involving cooling of the reaction mass by cooling the walls of the reaction vessel, there has always been danger of gelling of some of the cellulose acetate solution.

The cooling of mixtures of the reagents employed for the acetylation of cellulose has been suggested previously. Also methods of acetylating cellulose have been described in which cellulose is pretreated with acetic acid followed by cooling to cause crystallization of the acetic acid. These prior processes have the disadvantage that one of the reagents, namely acetic acid, assumes a solid form and either the amount of liquid present in insufficient to uniformly contact the cellulose or the amount of liquid employed is much greater than is necessary for the acetylation to occur, thus adding to the recovery problems connected with cellulose acetate manufacture. Also in those cases where the temperature of the esterification is referred to, that there is external cooling of the reaction vessel may be discerned from the description of the process.

One object of my invention is to provide a method for making cellulose acetate in which the application of cooling to the walls of the esterification vessel is absent during the acetylation of the cellulose. Another object of my invention is to provide a process for the acetylation of cellulose in which the reaction may be allowed to proceed rapidly but yet the viscosity of the resulting product may be that desired. Other objects of my invention will appear herein.

A cellulose esterification mass is characterized by poor heat conductivity and by relatively poor heat transfer between the mass and the walls of the containing vessel. Consequently prior to my invention it has been necessary when control of the maximum temperature was desired to only allow the reaction to proceed slowly. In the case of cellulose acetate contact of the cellulose ester solution with a cool surface tended to cause gelling and clinging of the gel to the surface thus causing difficulty in cooling the mass. Also, the part of the solution which is next to the walls of the containing vessel is lower in temperature than the main part of the reaction. This lower temperature will, of course, retard the reaction. By the time the main part of the reaction is finished the cellulose in the part next to the walls is still only partially esterified and it is necessary to continue the reaction until this part of the cellulose also is fully esterified. This combination of the reaction will cause a drop in viscosity of the cellulose acetate first esterified.

I have found that the difficulties heretofore attendant on the manufacture of cellulose acetate where temperature control was desired are not met with in the making of cellulose acetate if the acetic anhydride employed has a temperature of 0° F. or lower and the circulation of cold water in the jacket surrounding the mixer is avoided. It is also desirable that the acetic acid employed be kept at a temperature above that at which it will crystallize, in the mass.

I have found that by using acetic anhydride cooled to an extremely low temperature for the acetylation of cellulose, the reaction may be conducted rapidly and yet the temperature can be controlled so as not to exceed a maximum.

In the making of high viscosity cellulose acetates it is desirable that the reaction temperature does not exceed 90° F. or better 80° F. while in the making of medium viscosity esters maximums between 100° F. and 110° F. are usually employed, particularly with proportions of sulfuric acid catalyst of 5 to 10% (based on the cellulose starting material).

This invention is primarily concerned with processes of making cellulose acylates in which substantially all of the acyl is acetyl, the ester containing no more than 10% of other acyl such as propionyl or butyryl.

The acetic anhydride employed for the acetylation is cooled to at least 0° F. and preferably lower, such as −15°, −25° or even lower such as down to −50° F. As the cooled anhydride takes part in the reaction the consumption of the heat of reaction takes place directly at the point where the reaction is taking place. By this means a comparatively large part of the acetylation of the cellulose takes place at a very low temperature, which affords protection for the cellulose from breakdown until it becomes protected by the presence of acetyl groups thereon. This makes it possible to allow the reaction to proceed to a higher maximum temperature, resulting in a much shorter reaction time and higher viscosities.

In preparing cellulose esters it is often advantageous to first activate the cellulose by treating it with acetic acid at a temperature of 100° F. or above, such as a temperature between 100° F. and 130° F. To then cool this mass of cellulose and acetic acid requires a considerable time whereas by refrigerating the acetic anhydride to be employed in the esterification sufficiently to absorb the heat present in the mass saves time and facilitates the whole operation. The temperature to which the anhydride should be cooled is governed by the conditions of operation. For instance the lower the ratio of anhydride to the cellulose-acid mass, the lower the temperature to which the anhydride should be cooled. The more moisture which is present in the cellulose-acid mass, the lower the temperature required for the anhydride. In general, the temperature of the anhydride should be selected so low that the esterification mass, after addition of the anhydride and the reaction between the anhydride and the water present, should have a temperature below 60° F., and preferably below 40° F. The lower the ratio of anhydride to the cellulose-acid mass the lower the temperature to which the anhydride has to be cooled in order to accomplish the purpose of this invention. If the anhydride is cooled to only 0° F. the ratio has to be at least 1 and preferably 2 if high viscosity esters are derived. If desired the cellulose-acid mass can be cooled to some extent before adding the anhydride to aid in lowering the temperature. It is important however to prevent gelling in the reaction mass that no further circulation of the cooling medium in the water jacket of the esterification vessel take place after the esterification begins which is but shortly after the addition of the anhydride to the mass containing cellulose, acetic acid and catalyst.

Cellulose acetate may be prepared by a process in accordance with my invention by first presoaking the cellulose in acetic acid such as at 100° F. for 1 hour. If desired the cellulose may be prepared for esterification by the pretreatment method described in my application Serial No. 378,249 filed February 10, 1941, using a major proportion of acetic acid as the pretreating acid, or by first soaking with acetic acid without catalyst followed by the addition of a small proportion of catalyst and continuing of the pretreatment until the desired activation has been obtained. If desired the mass may then be cooled such as down to 60° F. and the refrigerated acetic anhydride added thereto or in lieu of the cooling of the cellulose and pretreating liquid, the anhydride may be sufficiently cooled that the desired extraction of heat is accomplished thereby.

If added catalyst is necessary to make the esterification go quickly it may be added with the cold acetic anhydride or it may be added in acetic acid solution at substantially the same time. At the time of addition of the anhydride to the mass it may sometimes be desirable to keep the temperature of the liquid in the water jacket slightly above that of the reaction mass to assure uniformity of the reaction in the esterification vessel, the circulation of cold water in the water jacket surrounding the mixer is stopped, if this hasn't been done previously. In order to make the acetylation go quickly at the low temperature imparted by the refrigerated anhydride it is desirable that the sulfuric acid catalyst be present in a proportion of at least 5% and preferably between 5 and 10%. With extremely low temperatures however, it is desirable to use larger proportions of sulfuric acid such as up to 15 or 20%. When a low liquid to cellulose ratio is employed in the acetylation process, it is desirable to use less than 5%, such as 2 or 3% of sulfuric acid to prevent having too high a catalyst concentration in the esterification bath unless an extremely low initial temperature is employed.

The degree of refrigeration of the acetic anhydride is governed by the proportion of anhydride to the other ingredients of the esterification mixture and by the temperature of those other ingredients. For instance if a pretreatment method such as described in my application Serial No. 378,249 is used, the liquid to cellulose ratio is low and it would ordinarily be necessary only to cool the acetic anhydride to approximately 0° F. without any cooling of the pretreated cellulose. If, however, more solvent is added than that resulting from the pretreatment a lower anhydride temperature is desirable. If an amount of pretreating liquid 3 or 4 times the cellulose is used, the anhydride added to induce the esterification should be cooled down considerably below 0° F., such as −25° F., or the mass of cellulose and pretreating liquid should also be subjected to a cooling down from the pretreatment temperature, such as from 100° F. down to 60° F. especially if the amount of the pretreating liquid is more than 4 times the amount of cellulose.

Obviously in any exothermic reaction the heat generated will raise the temperature of the system if not as high as that of the reacting mass. Therefore the term "external cooling" as used herein refers to a positive and deliberate removal of the heat units by external means from the reaction mass as distinguished from the passive cooling which takes place by a transfer of units thru out the system. A circulation of cold water thru the water jacket surrounding the esterification vessel is an external cooling while merely having water present in the water jacket without circulation has little or no influence on using up heat except only as it is part of the system. "External cooling" therefore only applies to circulation of water in the jacket or an equivalent positive external cooling of the reaction vessel.

The following examples illustrate this invention:

*Example 1.*—25 lbs. of refined cotton linters was presoaked for one-half hour at 100° F. with a mixture of 114½ lbs. of acetic acid and 14½ lbs. of propionic acid. A mixture of 73 cc. of sulfuric acid and 41 cc. of acetic acid was added thereto and the treatment was continued for about one-quarter hour. The mass was cooled to 60° F., which cooling required about one-half hour. 66 lbs. of acetic anhydride, having a temperature of −10° F., was thoroughly mixed into the mass followed by incorporation of 347 cc. of sulfuric acid dissolved in 187 cc. of acetic acid. The addition of catalyst induces esterification and the operation of the pump, which circulates cold water in the water jacket of the esterification vessel, was stopped at this point. The esterification proceeded rapidly and the temperature rose to a maximum of approximately 115° F. The esterification mass was free of fibers about one hour after the start of the esterification reaction. A mixture of 19¼ lbs. of water, 34 lbs. of acetic acid and 330 grams of magnesium carbonate was added and the cooling pump was again started, passing water, having a temperature of 90–100° F., through the water jacket of the vessel so as to remove the heat caused by the reaction at the acetic anhydride and the water. The hydrolysis was conducted for 70 hours at 100° F. and the cellulose ester was then precipitated by rapidly stirring the mass into dilute acetic acid. The total time consumed in the esterification vessel from the introduction of the cellulose and presoaking liquid up to the removal of the completed esterification mixture from the vessel was 3 hours and 35 minutes. The mass at the completion of the esterification was drawn off into a container, which was allowed to stand at 100° F. for the hydrolysis stage.

*Example II.*—550 lbs. of cotton was added to 2950 lbs. of acetic acid in a Werner and Pfleiderer type mixer and the mixture kept for one-half hour at 100° F., whereupon 6 lbs. of sulfuric acid diluted with 2 lbs. acetic acid were added and the mixture cooled to 65° F. To this mixture was then added 1340 lbs. acetic anhydride containing 30 lbs. sulfuric acid, which mixture had been cooled to —40° F. The jacket water of the mixer was then shut off and the reaction proceeded, reaching a maximum temperature of 110° F. in 2 hours. Fifteen minutes after this maximum temperature was reached a smooth solution of good viscosity free from fiber and grain was obtained. To this was then added 1,000 lbs. of 65% acetic acid and hydrolysis carried out in the customary way.

*Example III.*—550 lbs. of specially purified high alpha cellulose sulfite pulp was added to 3,000 lbs. of acetic acid and the mixture kept for one-half hour at 100° F., whereupon 6 lbs. of sulfuric acid diluted with 2 lbs. of acetic acid was added and the mixture cooled to 65° F. To this mixture was then added 1340 lbs. of acetic anhydride containing 30 lbs. sulfuric acid, which mixture had been cooled to —50° F. The mixer jacket water was then shut off and the reaction proceeded in 2½ hours to a maximum temperature of 105° F. After one-half hour more a brilliant solution of good viscosity and free from grain and fiber was obtained. To this was added 1200 lbs. of 65% acetic acid and the hydrolysis carried out in the customary way.

I claim:

1. A dope esterification process of preparing a cellulose ester the acyl content of which essentially consists of saturated monocarboxylic fatty acid groups of 2–4 carbon atoms, 90–100% of the acyl being acetyl, which comprises pretreating cellulose with acetic acid, adding an esterifying amount of acetic anhydride having a degree of coldness which imparts a temperature of less than 40° F. to the mass after the anhydride addition and the destruction of the water present in the mass and conducting the esterification of the cellulose in the presence of a sulfuric acid catalyst and in the absence of external cooling until substantially complete esterification of the cellulose has occurred.

2. A dope esterification process of preparing a cellulose ester the acyl content of which essentially consists of saturated monocarboxylic fatty acid groups of 2–4 carbon atoms, 90–100% of the acyl being acetyl, which comprises preheating 1 part of cellulose with ¼–2 parts of a pretreating bath in which acetic acid predominates, adding an esterifying amount of acetic anhydride thereto, which anhydride has a temperature not more than 0° F. which is sufficiently low to impart a temperature of less than 40° F. to the mass after the anhydride addition and the destruction of the water present in the mass and esterifying the cellulose in the presence of a sulfuric acid catalyst and in the absence of external cooling until substantially complete esterification of the cellulose has occurred.

3. A process of preparing cellulose acetate which comprises pretreating 1 part of cellulose with ¼–2 parts of a pretreating bath essentially consisting of acetic acid and a small amount of sulfuric acid, adding thereto an esterifying amount of acetic anhydride having a temperature of less than 0° F. which is sufficiently low to impart a temperature of less than 40° F. to the mass after the anhydride addition and the destruction of the water present in the mass and esterifying the cellulose, using a sulfuric acid catalyst and in the absence of external cooling until complete esterification of the cellulose has occurred.

4. A dope esterification process of preparing a cellulose ester, the acyl content of which essentially consists of saturated monocarboxylic fatty acid groups of 2–4 carbon atoms, 90–100 per cent of the acyl being acetyl, which comprises pretreating cellulose with acetic acid, then adding an esterifying amount of acetic anhydride having a temperature of approximately 0° F., the ratio of acetic anhydride to the cellulose-acid mass to which it was added being approximately 2, and conducting the esterification of the cellulose in the presence of a sulphuric acid catalyst and in the absence of external cooling until substantially complete esterification of the cellulose has occurred.

CARL J. MALM.